US010767609B2

(12) United States Patent
Fuchs et al.

(10) Patent No.: US 10,767,609 B2
(45) Date of Patent: Sep. 8, 2020

(54) INTERNAL COMBUSTION ENGINE AND METHOD FOR STARTING AN INTERNAL COMBUSTION ENGINE

(71) Applicant: INNIO Jenbacher GmbH & Co OG, Jenbach, Tiro (AT)

(72) Inventors: Jochen Fuchs, Jenbach (AT); Hang Lu, Garching b. Munich (DE)

(73) Assignee: INNIO Jenbacher GmbH & Co OG, Jenbach (AT)

( * ) Notice: Subject to any disclaimer, the term of this patent is extended or adjusted under 35 U.S.C. 154(b) by 98 days.

(21) Appl. No.: 15/570,261

(22) PCT Filed: Mar. 16, 2016

(86) PCT No.: PCT/AT2016/050062
§ 371 (c)(1),
(2) Date: Oct. 27, 2017

(87) PCT Pub. No.: WO2016/172748
PCT Pub. Date: Nov. 3, 2016

(65) Prior Publication Data
US 2018/0135571 A1 May 17, 2018

(30) Foreign Application Priority Data
Apr. 27, 2015 (AT) .................................. 251/2015

(51) Int. Cl.
*F02M 35/10* (2006.01)
*F02D 41/06* (2006.01)
(Continued)

(52) U.S. Cl.
CPC ... *F02M 35/10163* (2013.01); *F02B 29/0412* (2013.01); *F02B 33/446* (2013.01);
(Continued)

(58) Field of Classification Search
CPC ............ F02B 37/16–168; F02B 37/004; F02B 37/013; Y02T 10/144; F02D 41/0007; F02D 41/062
See application file for complete search history.

(56) References Cited

U.S. PATENT DOCUMENTS 5,058,558 A * 10/1991 Ueda ....................... F02B 67/06
123/559.1
6,659,071 B2 * 12/2003 LaPointe .................. F02B 1/04
123/295
(Continued)

FOREIGN PATENT DOCUMENTS

DE          31 35 107 A1    4/1982
DE    10 2011 010 288 A1    8/2012
(Continued)

OTHER PUBLICATIONS

Office Action issued in connection with corresponding AT Application No. A 251/2015 dated Sep. 15, 2015.
(Continued)

Primary Examiner — Laert Dounis
(74) Attorney, Agent, or Firm — Fletcher Yoder, P.C.

(57) ABSTRACT

Internal combustion engine with at least one turbocharger having a compressor, a bypass valve by means of which the compressor can be bypassed by at least a partial flow of a fuel mixture provided for the combustion, and a control or regulating unit connected to the bypass valve for regulating or controlling a degree of opening of the bypass valve, whereby the control or regulating unit is designed to open and/or at least partially keep open the bypass valve when starting the internal combustion engine.

10 Claims, 4 Drawing Sheets

(51) Int. Cl.
*F02D 41/00* (2006.01)
*F02B 37/16* (2006.01)
*F02B 37/013* (2006.01)
*F02D 19/02* (2006.01)
*F02M 21/04* (2006.01)
*F02B 33/44* (2006.01)
*F02B 29/04* (2006.01)

(52) U.S. Cl.
CPC .......... *F02B 37/013* (2013.01); *F02B 37/162* (2019.05); *F02D 19/02* (2013.01); *F02D 41/0007* (2013.01); *F02D 41/0027* (2013.01); *F02D 41/062* (2013.01); *F02M 21/04* (2013.01); *Y02T 10/144* (2013.01); *Y02T 10/146* (2013.01); *Y02T 10/32* (2013.01)

(56) References Cited

U.S. PATENT DOCUMENTS

| | | | | |
|---|---|---|---|---|
| 8,136,513 | B2* | 3/2012 | Schiestl | F02B 29/0418 123/435 |
| 8,429,912 | B2* | 4/2013 | Guggenberger | F02B 37/013 123/562 |
| 2009/0139230 | A1* | 6/2009 | Baldwin | F02B 33/40 60/612 |
| 2011/0077847 | A1 | 3/2011 | Barr et al. | |
| 2014/0109866 | A1* | 4/2014 | Gruber | F02M 21/0215 123/262 |
| 2014/0230430 | A1* | 8/2014 | Krug | F02B 29/0412 60/600 |
| 2015/0083094 | A1* | 3/2015 | Pursifull | F02D 23/00 123/559.1 |
| 2015/0139777 | A1* | 5/2015 | Almkvist | F02D 41/0007 415/1 |
| 2015/0152777 | A1* | 6/2015 | Kim | F02B 37/18 60/602 |
| 2015/0219027 | A1* | 8/2015 | zur Loye | F02D 41/0027 60/603 |
| 2016/0053724 | A1 | 2/2016 | Flohr et al. | |
| 2016/0146141 | A1* | 5/2016 | Hirzinger-Unterrainer | F02D 41/062 123/179.16 |

FOREIGN PATENT DOCUMENTS

| | | | |
|---|---|---|---|
| DE | 10 2013 213351 A1 | 10/2014 | |
| DE | 10 2014 006019 A1 | 10/2015 | |
| EP | 1 197 646 A1 | 4/2002 | |
| EP | 2 199 580 A1 | 6/2010 | |
| EP | 2199580 A1 * | 6/2010 | ............ F02D 23/00 |
| EP | 2 873 828 A1 | 5/2015 | |
| WO | 2014/200085 A1 | 12/2014 | |
| WO | 2014/208138 A1 | 12/2014 | |

OTHER PUBLICATIONS

Machine translation of International Search Report and Written Opinion issued in connection with corresponding PCT Application No. PCT/AT2016/050062 dated Jul. 15, 2016.

Office Action issued in connection with corresponding AT Application No. A 251/2015 dated Aug. 19, 2016.

Office Action issued in connection with corresponding EP Application No. 16722519.2 dated Aug. 10, 2018 (English Translation not available).

* cited by examiner

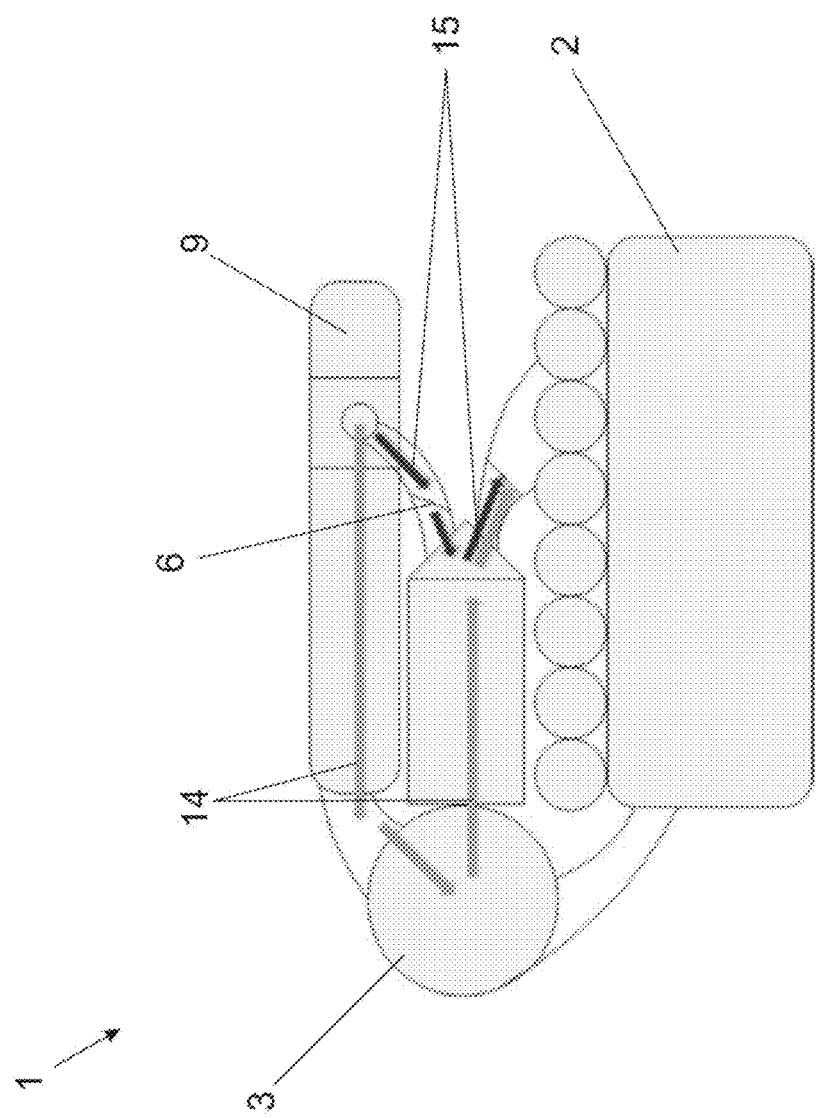

INTERNAL COMBUSTION ENGINE AND METHOD FOR STARTING AN INTERNAL COMBUSTION ENGINE

The present invention relates to an internal combustion engine with the features of the preamble of claim 1 and a method for starting an internal combustion engine.

BRIEF DESCRIPTION OF THE INVENTION

It is known to equip internal combustion engines with a turbocharger, a mixture cooler and a bypass valve. The bypass valve can be opened by a control or regulating unit. This allows a partial flow of a fuel mixture provided for the combustion to bypass a compressor of the turbocharger. In this way, the charge-air pressure and ultimately the power of the internal combustion engine can be controlled or regulated with relatively short reaction times. In this case, of course, the bypass valve is closed when full power or an increase in the rotational speed is required. In the prior art, the bypass valve was therefore kept closed during the starting process.

The disadvantage of this is that the compressor of the turbocharger and the mixture coolers form a large "dead volume" which must first be filled before the internal combustion engine can start. In other words, the fuel mixture must travel a relatively long distance, in which case flow impediments, such as the compressor of a turbocharger and any mixture coolers, must be overcome. This leads to a relatively long starting time of the internal combustion engine.

An object of an embodiment of this invention is to provide an internal combustion engine and a method for starting an internal combustion engine wherein the starting time is shortened.

With regard to the internal combustion engine, this is achieved by a control or regulating unit that controls a bypass valve to at least partially bypass a compressor of a turbocharger when the internal combustion engine is started. With regard to the method, this object is achieved by at least partially bypassing a compressor of a turbocharger during a startup of the internal combustion engine.

In an embodiment of the invention, the fuel gas can be brought into a zone provided for combustion, for example a cylinder, as quickly as possible.

For starting, the internal combustion engine is first towed by an external drive. This creates suction which is responsible for transporting the fuel mixture. As soon as the fuel mixture reaches the zone provided for the ignition, the internal combustion engine no longer needs to be towed but runs by itself.

Then the effect of the at least one turbocharger starts, wherein the fuel mixture is no longer merely aspirated by the suction effect of the piston-cylinder unit, but is also actively transported by the compressor of the at least one turbocharger.

An embodiment of the invention is based on the finding that the time in which the transport of the fuel mixture is produced only by the suction effect of the piston-cylinder unit can be shortened by opening the bypass valve. The path of the fuel mixture via the bypass valve is firstly shorter and secondly associated with less resistance.

The fuel mixture reaches the zone provided for the combustion more quickly and the engine thus starts faster. It should be noted that the direction of the fuel mixture flow through the bypass valve reverses as soon as the effect of the at least one turbocharger starts. This is a simple consequence of the fact that there is a higher pressure after the compressor than before the compressor. From this time, the control or regulating action of the bypass valve starts. Consequently, the compressor of the turbocharger can be bypassed in both directions by the bypass valve.

Various valves can be used as the bypass valve. For example, the bypass valve can be a valve that can switch between complete closure and complete opening. Of course, it may be preferable to use a bypass valve which, in addition to complete closure and complete opening, supports a plurality of further opening angles.

Embodiments of the invention are defined in the dependent claims.

An embodiment of the invention can be used in internal combustion engines with either one or a plurality of turbochargers. In the case of a plurality of turbochargers, the compressors can be connected in series.

An embodiment in which the compressors of all turbochargers of the internal combustion engine can be operated at least by a partial flow of the fuel mixture provided for the combustion by means of the bypass valve, since this maximizes the positive effect of an embodiment of the invention.

An embodiment of the invention can be constructed in a particularly simple manner by providing a bypass line for bypassing the compressor of the at least one turbocharger, wherein the bypass valve is arranged in the bypass line. More particularly, there can be an embodiment in which a bypass line for bypassing the at least one mixture cooler is provided, whereby the bypass valve is arranged in the bypass line.

More particularly, there can be an embodiment in which the bypass line for bypassing the at least one mixture cooler is combined with the bypass line for bypassing the compressor of the at least one turbocharger.

More particularly, a mixing device can be provided, by means of which a fuel mixture, in particular a fuel-air mixture, can be produced. The mixing device can be designed as a venturi mixer, a gap mixer, a gas metering valve, etc. (Gas metering valves have regulation or control of the degree of mixing.)

The bypass line can be connected to an outlet of the mixing device for the fuel mixture.

The internal combustion engine may have one or a plurality of cylinders in which the fuel combustion takes place. More particularly, an embodiment of the invention can be used in a gas motor which may be stationary. The gas engine can have a gas mixer in front of an exhaust gas turbocharger and/or in front of a mixture cooler.

In an embodiment, the bypass valve is completely opened or held completely open on starting the internal combustion engine. Of course, partial opening or partial holding open may also be useful in some situations.

More particularly, an embodiment of the invention can be used in internal combustion engines that drive a generator. This generator can be suitable for feeding electrical energy into a power supply network. The internal combustion engine can be designed as a stationary Otto gas engine. The power supply network may, for example, be a public power supply network.

An embodiment of the invention can also be used in non-stationary internal combustion engines (for example: ship engines).

However, an embodiment of the invention can also be used in conjunction with other consumers, for example a gas compressor.

BRIEF DESCRIPTION OF THE DRAWINGS

Further advantages and details of the invention can be found in the figures and the related description of the figures. They are as follows.

DETAILED DESCRIPTION

Figure 1:
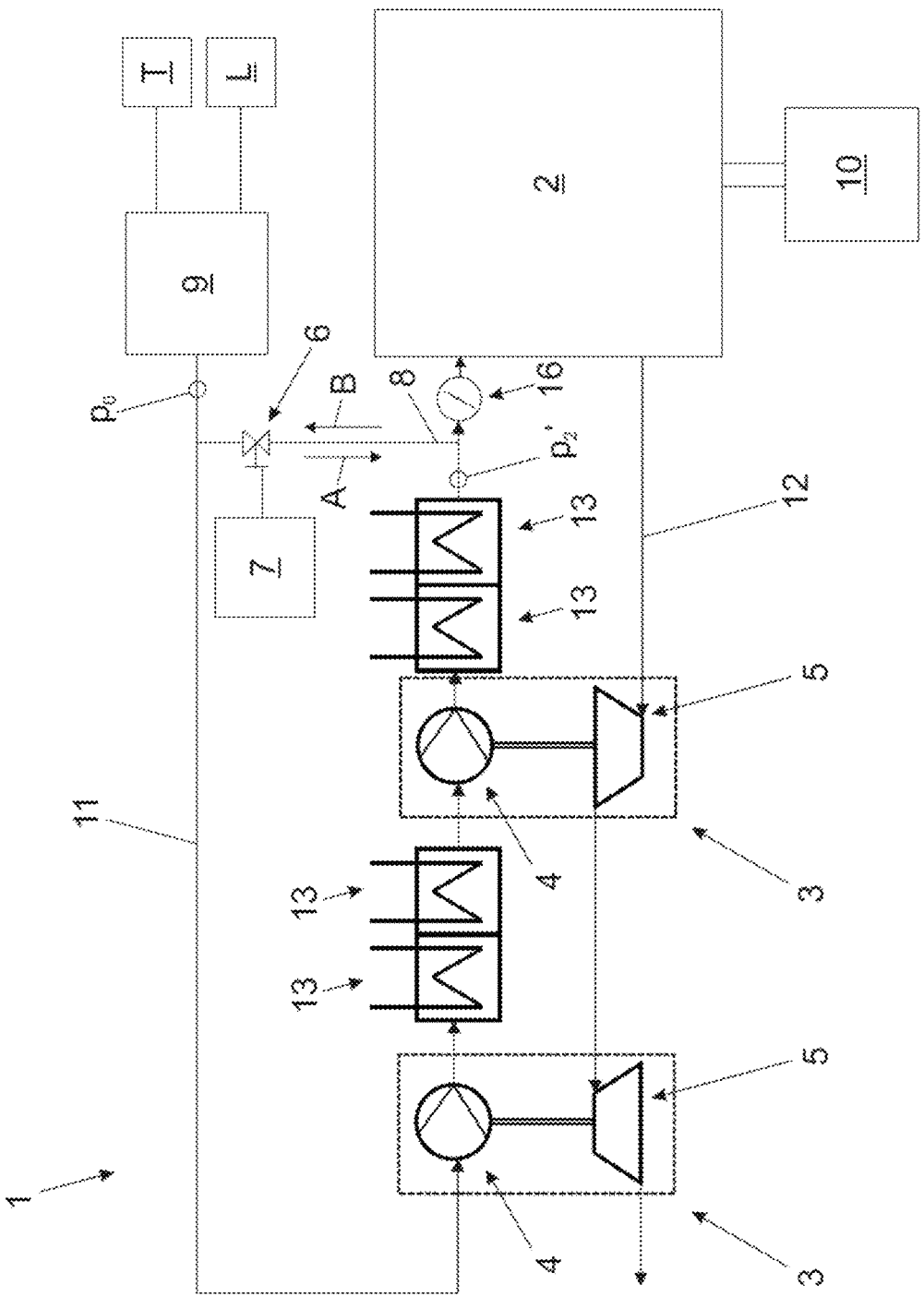
FIG. 1 an embodiment of an internal combustion engine with two turbochargers.

FIG. 1 shows an internal combustion engine 1 with a cylinder block 2. Cylinders (not shown) are arranged in it, in which the combustion of a fuel-air mixture occurs. A mixing device 9 is provided to generate the fuel-air mixture. This is connected to a fuel tank T as well as a suction device for air L. The fuel/air mixture produced in the mixing device 9 is fed to the engine block 2 via a supply line 11. The gases generated by the combustion in the cylinder block 2 are discharged via an exhaust gas line 12.

Two turbochargers 3 are provided, wherein a compressor 4 of the turbochargers 3 is arranged in the supply line 11. The turbines 5 of the turbochargers 3 are arranged in the exhaust gas line 12. The compressors 4 are connected in series in the supply line 11. Analogously, the turbines 5 are also connected in series. The compressors 4 are each followed by two mixture coolers 13. The turbines 5 drive the compressors 4, which generate an increased pressure—the charge-air pressure—of the fuel-air mixture. As a result of this increased pressure, more fuel-air mixture reaches the cylinders than in a naturally aspirated engine design, which increases the performance.

A bypass line 8 is also provided, in which the bypass valve 6 is arranged. During the operation of the internal combustion engine 1, a partial flow of the fuel-air mixture cannot be supplied to the engine block 2 by opening the bypass valve 6. Due to the charge-air pressure, a partial flow is instead fed back into the supply line 11 (via the bypass line 8 in the flow direction B). This reduces the power of the internal combustion engine 1. As a result of this measure, the power of the internal combustion engine 1 can be regulated or controlled. This regulation or control takes place in a control or regulation device 7, which is connected to the bypass valve 6.

A common or individual wastegate (not shown) for the turbocharger 3 can also be present.

Before starting the internal combustion engine 1, both the supply line 11 and the bypass line 8 are not filled with fuel-air mixture. This is not done for safety reasons. For example, the fuel-air mixture could ignite due to the effect of heat in the supply line 11.

If the internal combustion engine 1 is now towed by an external drive (not shown), the fuel-air mixture is aspirated. In the prior art, the fuel-air mixture had to be suctioned through the supply line 11, the compressors 4 and the mixture coolers 13. By opening the bypass valve 6, the fuel-air mixture must travel down a substantially shorter and more resistance-free path via the bypass line 8 (in the flow direction A), which reduces the startup time.

A generator 10 is driven by means of the internal combustion engine 1—in this case, a stationary gas engine. The generator 10 can, for example, be connected to a power supply network and can supply it with energy. The internal combustion engine 1 can, of course, also serve other consumers, for example mechanical drives or compressors.

Figure 2:
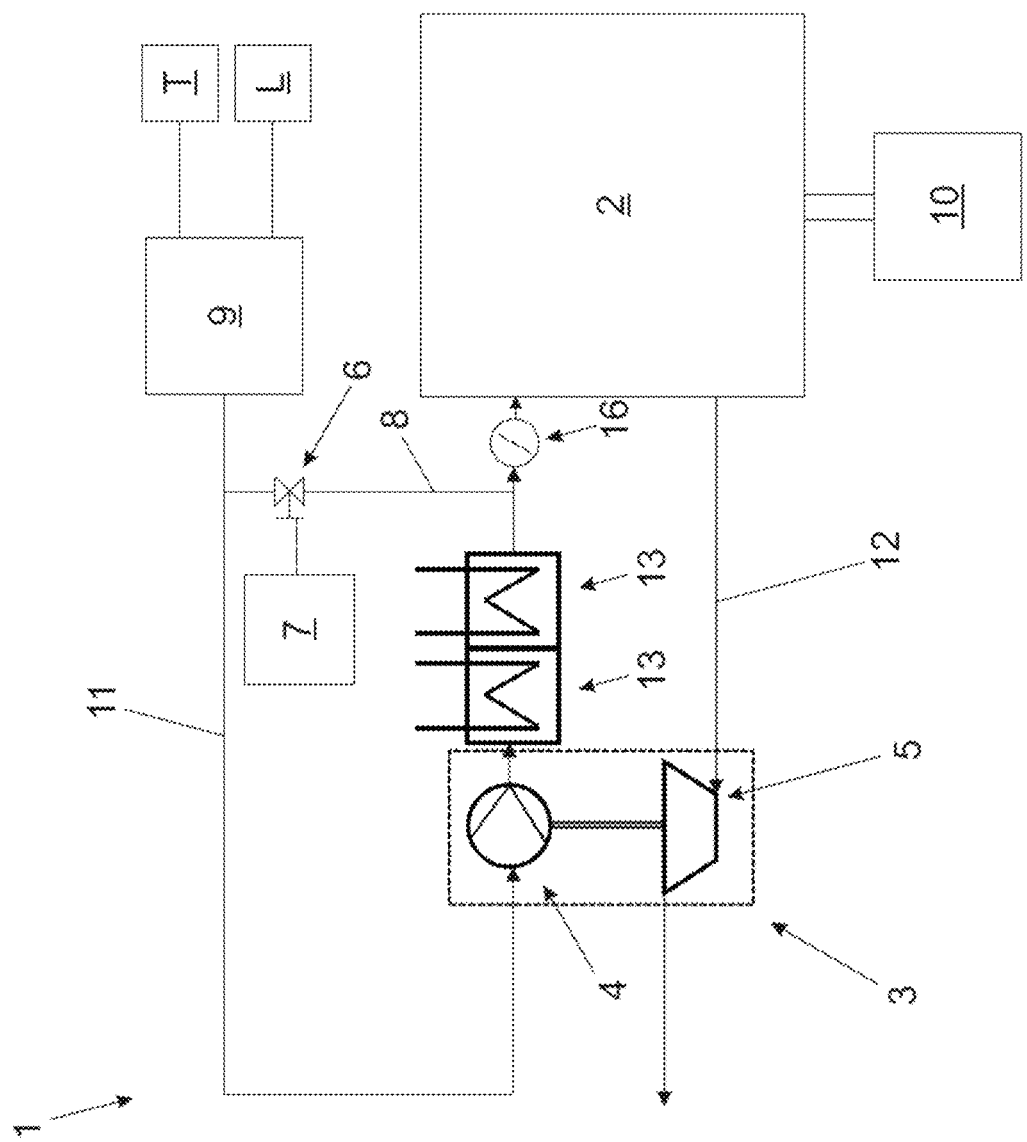
FIG. 2 an embodiment of an internal combustion engine with one turbocharger, and FIG. 3 a further embodiment of an internal combustion engine with two turbochargers, FIG. 4 a schematic representation for comparison of the prior art with an embodiment of the invention.

FIG. 2 shows an embodiment of the invention with a single turbocharger 3. Otherwise, this embodiment is analogous to that of FIG. 1.

Figure 3:
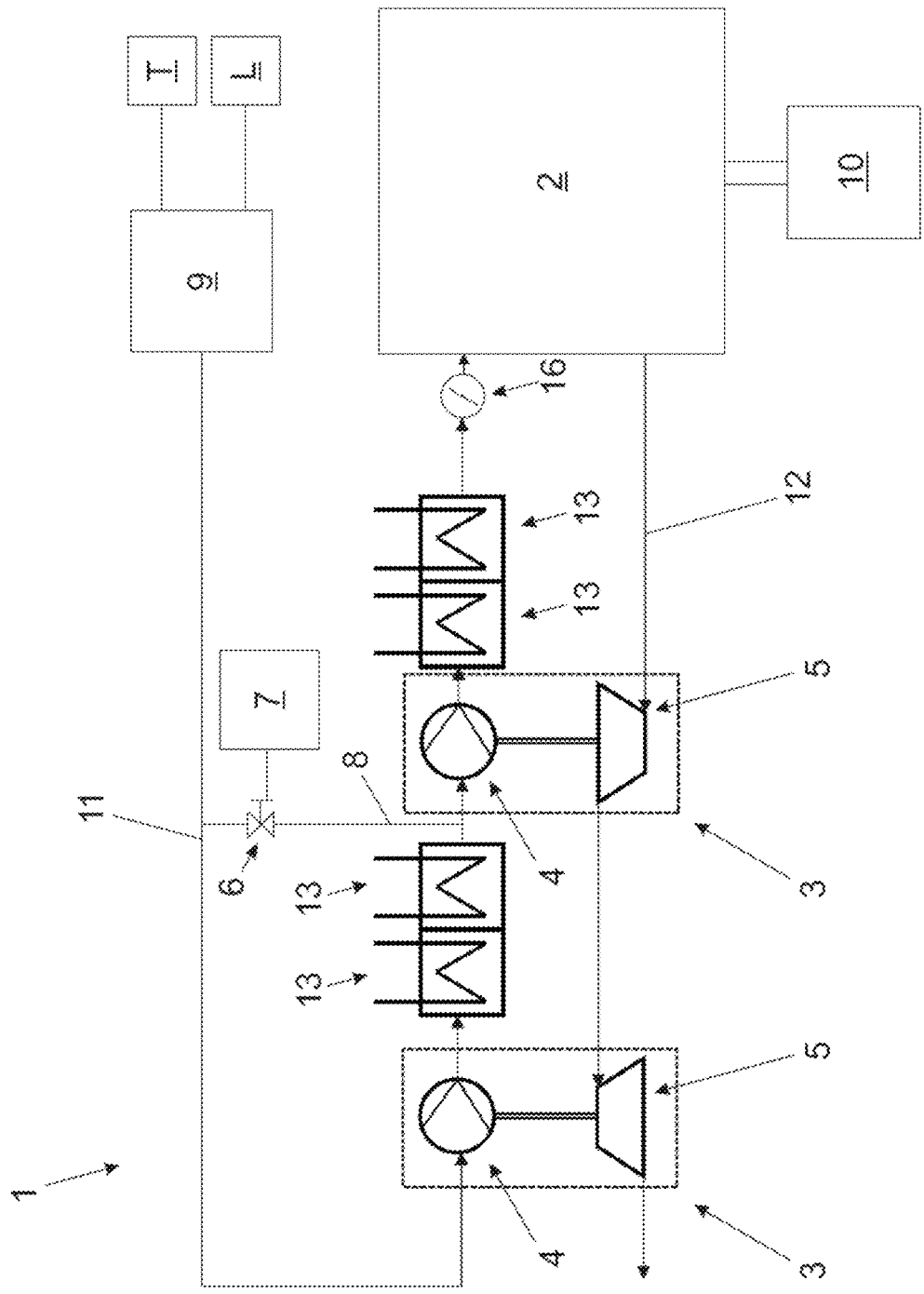

FIG. 3 shows an exemplary embodiment of the invention with two-stage supercharging as in FIG. 1, but the bypass line 8 and the bypass valve 6 are arranged here between the compressor stages (between the two compressors 4). The bypass line 8 here does not bypass both compressors 4, but only one compressor 4, in this case the low-pressure compressor.

Thus, when the bypass valve 6 is opened, the fuel mixture for the starting process is provided with a shorter path reduced flow resistance, but the fuel mixture must pass through a compressor 4 during the starting process.

It can nevertheless be advantageous to arrange the bypass valve 6 as shown in FIG. 3, for example because the bypass valve 6 must also be used for purposes of regulation in the normal operation of the internal combustion engine 1.

FIG. 4 is a side view of an internal combustion engine 1, wherein the shortening of the flow path caused by embodiments of this invention is expressed particularly clearly.

The engine block 2, turbocharger 3, mixing device 9 and bypass valve 6 can be seen.

In starting according to the prior art, the fuel mixture was required to take the long path indicated by the reference signs 14. The path indicated by reference sign 15 is the path that the fuel-air mixture according to embodiments of the invention must take. According to an embodiment of the invention, the fuel/air mixture must fill up only a fraction of the dead volume, or only a fraction of the path length must be travelled, whereby flow resistances must also be overcome.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An internal combustion engine comprising:
   a fuel source configured to provide fuel for the internal combustion engine;
   an air source configured to provide air for the internal combustion engine;
   a mixer coupled to the fuel source and to the air source, the mixer is configured to produce a flow of a fuel-air mixture, and wherein all of the fuel and the air delivered to the internal combustion engine flows through the mixer;
   a main line configured to direct the fuel-air mixture to the internal combustion engine, wherein the mixer discharges the fuel-air mixture into the main line;
   a first compressor coupled to the main line;
   a second compressor coupled to the main line, wherein the second compressor is downstream from the first compressor;

a first cooler downstream from the first compressor and upstream from the second compressor, wherein the first cooler couples to the main line;

a second cooler downstream from the second compressor, wherein the second cooler couples to the main line;

a bypass line coupled to the main line at a first location and at a second location, wherein the first location is upstream from the first compressor and the second location is downstream from the second cooler, wherein the bypass line reduces the distance between the mixer and an inlet to the internal combustion engine, wherein the bypass line bypasses the first compressor, the first cooler, the second compressor, and the second cooler and directs the fuel-air mixture in a first flow direction from the first location to the second location and into the internal combustion engine during startup of the internal combustion engine, wherein the bypass line selectively recirculates a portion of the fuel-air mixture in a second flow direction from the second location to the first location after startup of the internal combustion engine;

a bypass valve coupled directly to the bypass line and configured to control the flow of the fuel-air mixture through the bypass line in the first and second flow directions; and a controller coupled to the bypass valve, wherein the controller is configured to open or partially open the bypass valve during startup of the internal combustion engine to direct the fuel-air mixture in the first flow direction, wherein the controller is configured to open or partially open the bypass valve after startup to direct the fuel-air mixture in the second flow direction.

2. The internal combustion engine according to claim 1, wherein the bypass line is connected to an outlet of the mixer.

3. The internal combustion engine according to claim 1, wherein the internal combustion engine is a stationary gas engine.

4. The internal combustion engine according to claim 1, comprising a first turbocharger, wherein the first turbocharger includes the first compressor.

5. The internal combustion engine according to claim 1, comprising a second turbocharger, wherein the second turbocharger includes the second compressor.

6. A method for starting an internal combustion engine, comprising:

directing fuel from a fuel source to a mixer;

directing air into the mixer to form a fuel-air mixture;

directing the fuel-air mixture through a bypass line that couples to a main line at a first location and a second location, wherein the main line comprises a first compressor of a first turbocharger and a second compressor of a second turbocharger, wherein the first location is upstream from the first and second compressors, wherein the second location is downstream from the first and second compressors, wherein the bypass line reduces the distance between the mixer and an inlet to the internal combustion engine;

opening a bypass valve to direct a flow of the fuel-air mixture through the bypass line in a first flow direction from the first location to the second location to bypass the first and second compressors in response to starting the internal combustion engine; and opening the bypass valve to direct a flow of the fuel-air mixture through the bypass line in a second flow direction from the second location to the first location to at least partially recirculate the fuel-air mixture through the first and second compressors after starting the internal combustion engine.

7. The method according to claim 6, wherein the bypass valve is at least partly opened and/or at least partially kept open while starting the internal combustion engine to direct the flow in the first flow direction.

8. The method according to claim 6, wherein the bypass valve is completely opened and/or completely kept open while starting the internal combustion engine to direct the flow in the first flow direction.

9. The method according to claim 6, wherein a generator is driven by the internal combustion engine.

10. The method according to claim 6, wherein a gas compressor is driven by the internal combustion engine after startup.

* * * * *